United States Patent [19]

Riley

[11] Patent Number: 4,679,969

[45] Date of Patent: Jul. 14, 1987

[54] POSITIVE FEED DRILL CLAMP SYSTEM

[75] Inventor: Patrick J. Riley, Columbus, Ohio

[73] Assignee: Rockwell International Corporation, El Segundo, Calif.

[21] Appl. No.: 848,652

[22] Filed: Apr. 7, 1986

[51] Int. Cl.$^4$ .......................... B23B 45/14; B23B 49/02

[52] U.S. Cl. .......................................... 408/87; 408/99; 408/103; 408/130

[58] Field of Search ..................... 408/87, 99, 100, 103, 408/130, 102, 79, 92

[56] References Cited

U.S. PATENT DOCUMENTS

| | | | |
|---|---|---|---|
| 2,909,949 | 10/1959 | Winslow | 408/99 X |
| 3,260,138 | 7/1966 | Frizzell | 408/99 |
| 3,273,424 | 9/1966 | Hughes | 408/130 X |
| 3,679,320 | 7/1972 | Bohorquez et al. | 408/99 |
| 3,967,687 | 7/1976 | Fowler | 408/99 X |

FOREIGN PATENT DOCUMENTS

| | | | |
|---|---|---|---|
| 912399 | 3/1982 | U.S.S.R. | 408/100 |

*Primary Examiner*—Gil Weidenfeld
*Assistant Examiner*—Steven C. Bishop
*Attorney, Agent, or Firm*—Charles T. Silberberg; Chris Papageorge

[57] ABSTRACT

A power drill system is disclosed which is hand held and manually operable. The drill system includes a drill and a positive feed unit for the drill connected thereto. A clamping member is connected at a lower portion thereof to a housing for the drill and feed unit. The clamp member is pneumatically powered to move it against a workpiece and clamp it against the housing at the location of the drill. A four way toggle switch controls the air pressure to the clamp member allowing the operator to control the clamping operation with one hand while the other hand holds the housing in the desired position.

17 Claims, 3 Drawing Figures

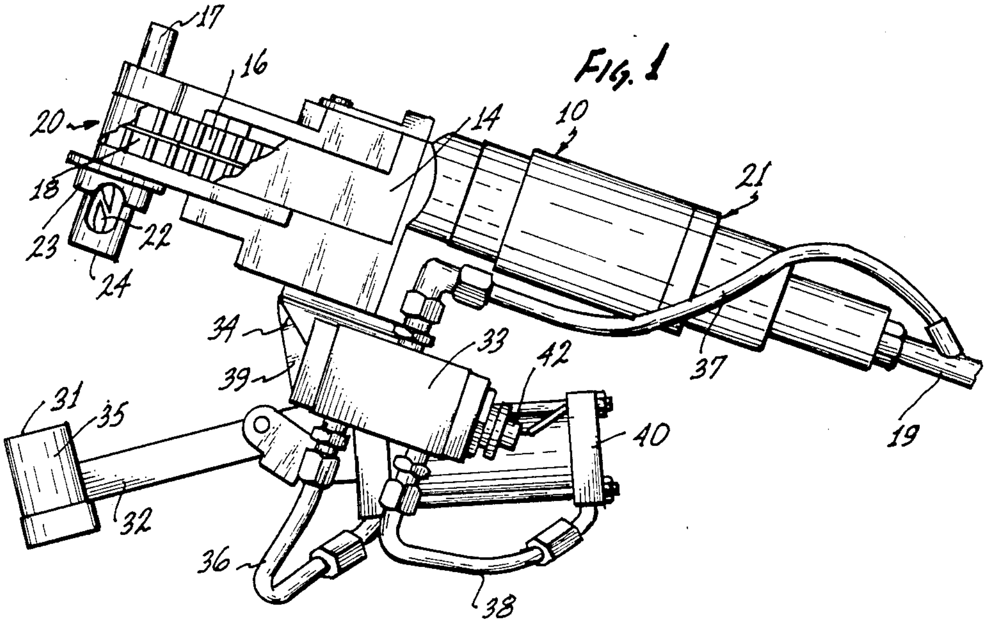
FIG. 1
FIG. 2
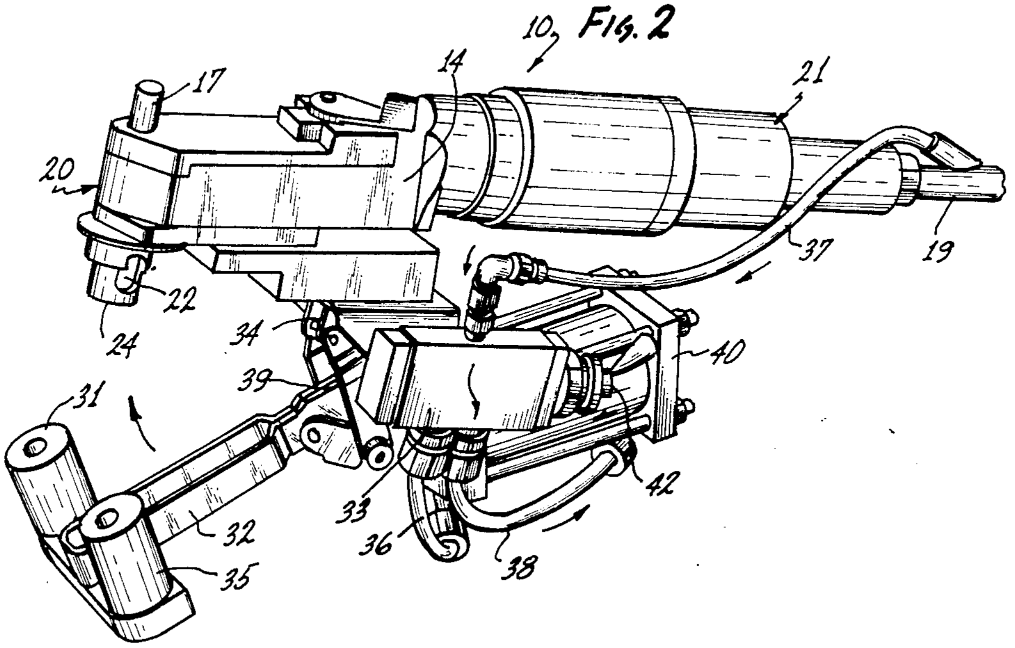

POSITIVE FEED DRILL CLAMP SYSTEM

This invention was made with Government support under Contract F33657-81-C-0210 awarded by the U.S. Air Force. The Government has certain rights in this invention.

BACKGROUND OF THE INVENTION

This invention relates to a novel apparatus for clamping a drill onto a workpiece for precision drilling of a hole at a desired location thereon.

Modern production methods often require precision drilling in cramped work locations. It is not feasible to use conventional precision drilling systems in such locations because prior art precision drilling systems typically require a substantial amount of working space to precisely secure the drill system to the workpiece. Indeed, some conventional portable drilling systems require that the drill be positioned against the workpiece template and rotated 90° in order to lock the drill into position. Frequently, modern production methods require precision drilling of holes in areas where a hand drill alone can barely fit. Consequently, with prior art systems, there is frequently no alternative but to drill the required hole manually with an ordinary hand drill. However, such hand drilling is time consuming and tends to result in imprecision and inaccuracy in the location, size and shape of the hole drilled.

One prior art method for precision drilling of holes in a workpiece uses a drill jig. Such prior art devices typically include a sliding member, one or more guide rods and a means for clamping the sliding member onto the workpiece. The drill bit is then inserted between two plates or into an aperture in one of the members. Such an apparatus is disclosed in U.S. Pat. No. 2,556,131 to WOLFSON. Since these types of apparatuses do not include a drill as an integral part of the structure and may have many different separable parts, setting up such a system may be time consuming and complex, and it frequently takes an inordinately long period of time to commence the actual drilling.

Many other types of prior art drill systems combine a drill with a workpiece support member. A bolt and mounting bracket structure may be incorporated in such systems to press the workpiece against the drill bit. However, the disadvantage with these systems are that the bolt typically must be manually turned to press the workpiece directly against the drill bit thereby positioning the bit at the precise location of the hole to be drilled. But, rotating the bolt thereby moving it longitudinally and rotationally against the workpiece can also move the workpiece out of position. Moreover, precise location of the hole to be drilled is often difficult because it is difficult to visually ascertain precisely where the workpiece is contacting tne drill bit. Moreover, as drilling commences and the pressure exerted against the drill bit is reduced, the rotating action of the drill bit tends to move it out of position on the workpiece. This may result in an oval hole or a larger hole than desired. An example of such a prior art device is U.S. Pat. No. 1,407,348 to HEER.

Another type of prior art drilling system combines a simple pair of tongs with a hand drill. A drill is mounted at an end of one of the tongs. At an opposing end of the other tong there is a flat disk which engages an underside of the workpiece. Closing the pair of tongs clamps the workpiece between the drill bit and the disk. However, it is difficult to get precise drilling done with such a system because one hand is required to apply pressure to keep the tongs closed while the other is required to apply pressure to operate the drill. Coordinating both hands in this manner makes operation of such a system awkward. Moreover, the pressure exerted on the workpiece decreases as the drilling operation proceeds. Reduction of pressure during drilling can enable the drill bit to move out of its desired position relative to the workpiece. This can introduce gross inaccuracies in the holes drilled. An example of sucn a drill apparatus is disclosed in U.S. Pat. No. 55,696 to NEVERGOLD.

Still another type of prior art system incorporates a carriage within which is a drill, a hydraulic feed mechanism and a clamping member. The workpiece is clamped within the carriage and tne drill is hydraulically moved against the workpiece and retracted therefrom at the end of the drilling operation. The primary disadvantage with such systems is that they are not portable and typically may only be used on a workpiece before the workpiece is integrated into the finished structure. An example of such a prior art device is disclosed in U.S. Pat. No. 3,041,896 to MAY.

In general, prior art devices are impractical for use in many areas which have limited working space or are relatively inaccessible. Moreover, most prior art precision drilling devices are not portable, and accurate drilling work using prior art devices typically requires that the workpiece be separate from the finished structure in order for it to be properly positioned in the drilling apparatus. In addition, prior art devices tend to be difficult and time consuming to set up properly and do not yield the drilling accuracy required for many modern production methods.

SUMMARY OF THE INVENTION

It is a principle object of the invention to provide a drill system which can be used for drilling where there is limited working space for maneuvering the system.

It is an object of the invention to provide a drill system having a relatively short nose portion for fitting into working areas of limited access.

It is another object of the present invention to provide a drill system which is portable.

It is another object of the invention to provide a power drill system which is manually held and operable.

It is another object of the invention to provide a portable drill system which is able to perform precision drilling.

It is a still further object of the present invention to provide a portable drill system which has a positive feed.

The system of the present invention is specifically designed to be a compact, inexpensive, positive feed drilling system which may be used in areas of limited access and limited space for maneuvering the system. An important feature of the present invention is its capability of automatically clamping the drill system onto the workpiece in a precise location thereon for precision drilling of a hole in the workpiece.

Generally, the invention comprises a drill to which is connected a clamp. The clamp is mounted at an underside portion of the housing of the drill so as to be movable relative thereto. The connection between the housing and the clamp is preferably a hinge connection allowing the clamp face to move toward as well as away from the head portion (which contains the drill bit) of the drill. Thus, the workpiece may be clamped into a secure position between the head portion of the drill and the face portion of the clamp.

For precision drilling work the head portion of the drill must be precisely positioned on a desired location on the workpiece and secured thereto at that precise location. For precise positioning a nosepiece is provided at the head portion of the drill which is received by a hole in a guide plate appropriately secured to the workpiece. Thus, the head portion of the drill can be precisely positioned on the workpiece in order to ensure precise drilling of a hole therein.

In order to facilitate and expedite operation of the drill system and to ensure accurate positioning of the drill system on the workpiece, the clamp is pneumatically powered. Thus, the clamp may be automatically moved toward or away from the workpiece and pneumatic pressure applied to clamp the workpiece securely into position against the drill head portion. As a result, the drill system operator can manually position the drill system on the workpiece and, when precisely positioned, automatically secure it thereto at that desired location.

From the foregoing it is apparent that the drill system of the present invention provides a drilling device which is portable, precise and easy to use. The drill system requires a minimum of maneuvering space to precisely secure it to a workpiece and obviates the need for a large and awkward drilling structure. Thus, it is apparent that the system of the present invention makes precise drilling faster, cheaper and more adaptable to mass production processes.

BRIEF DESCRIPTION OF THE DRAWINGS

FIG. 1 is a side view of the drilling system of the present invention.

FIG. 2 is a perspective view of the system illustrating the control valve, mating surface of the nosepiece of the drill head portion and the clamp member.

DETAILED DESCRIPTION OF THE PREFERRED EMBODIMENT

Figure 3:
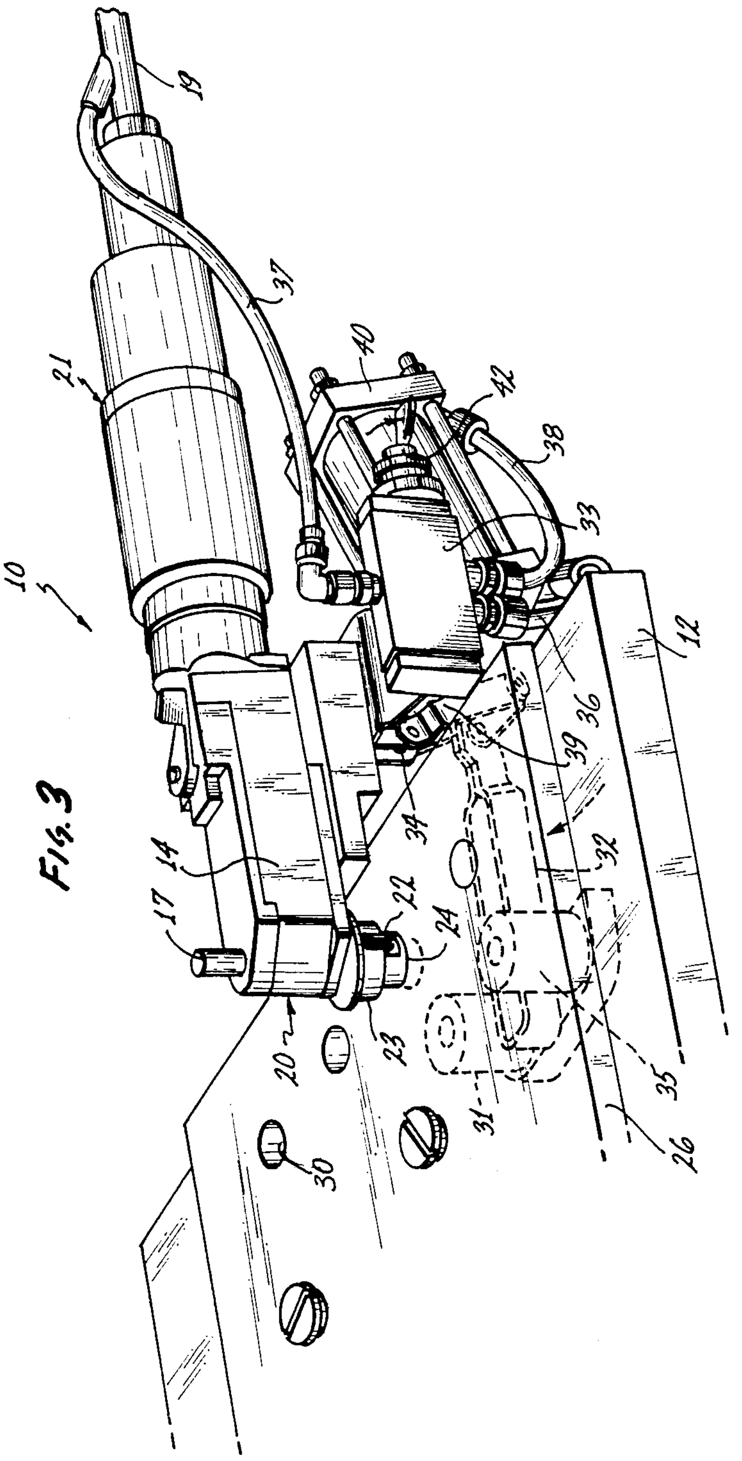
FIG. 3 is a perspective view of the drill system of the present invention showing the system clamped to a workpiece in preparation for drilling thereinto with a portion of the clamp shown in phantom.

Referring now to the drawings, FIGS. 1, 2 and 3 show the drilling system of the present invention generally designated by the numeral 10. Tne workpiece which is to be drilled using the system of the present invention 10 is generally designated by the numeral 12 in FIG. 3. The drill system 10 has a housing 14 which contains a feed unit 16 and a drill 18. Drill 18 is preferably mounted in a head portion 20 of the housing 14 and contains a drill bit 22 which is moveable in order to be fed into and out of the workpiece in a direction approximately normal to a surface thereof. Drill bit 22 is connected to and mounted within a portion of spindle 17. The feed unit 16 is preferably pneumatically powered to feed the drill bit 22 into the workpiece during the drilling operation and out of the workpiece 12 upon cessation of the drilling operation in a direction normal thereto.

Referring to FIG. 3, the head portion 20 has a nosepiece 23 which has a mating surface 24 which contacts the workpiece 12 in the general area where the drilling is to take place in order to properly position the drill bit 22 at a desired location on the workpiece 12. Alternatively, however, the nosepiece 23 of the head portion 20 may be adapted to mate instead with a guide plate 26 secured to the workpiece 12. When utilizing a guide plate 26, the nosepiece 23 is received by an aperture 30 in the guide plate 26; thus, when the nosepiece 23 is inserted in the aperture 30 the drill bit 22 is precisely positioned on the guide plate 26 for precise drilling into the workpiece 12.

When the nosepiece 23 is positioned on the guide plate 26 the drill bit 22 at the head portion 20 of the housing 14 passes through the appropriately localized aperture 30 on the guide plate 26 in order to drill a hole in the workpiece 12 at that desired location. The guide plate 26 may either be screwed onto the workpiece or clamped thereto using C- clamps to precisely and securely position the guide plate 26 on the workpiece 12.

A pneumatic motor (not shown) is mounted in the rear portion 21 of the housing 14. The pneumatic motor preferably powers both the drill 18 and the feed unit 16. The rear portion 21 preferably is a handle for the system 10.

Both the drill 18 and the drill feed unit 16 are preferably pneumatically powered. Conduit 19 supplies air under pressure to the drill 18 and feed unit 16. However, other types of power drive systems may also be utilized where appropriate.

The nosepiece 23 may also be detachable from the housing 14 and thus interchangeable with other nosepieces having different shapes, sizes or mating surfaces. The nosepiece 23 can thus be changed to accommodate workpieces having different shapes and sizes and/or guide plates having apertures of different sizes or shapes.

A clamp member 32 is connected to the housing 14 preferably by means of a hinge 34. The clamp member 32 is thus able to swing relative to the drill 18 or nosepiece 23 of the drill system in a direction toward and away from the nosepiece 23. Alternatively, however, the clamp member 32 may be mounted in slotted members (not shown) secured to the housing 14 enabling the clamp member 32 to move in a direction generally normal to the mating surface 24 of the head portion 20. Thus, the clamp member 32 can either be connected to the housing 14 so that it can rotate relative to and toward and away from the mating surface 24 or so that it can move normal to the mating surface 24 of the nosepiece 23.

Conduit 37 supplies pressurized air to control 33, and hoses 36 and 38 connect the control 33 to a compressed air cylinder or motor 40. The motor 40 is connected by a system of links 39 to the clamp member 32 in order to move the clamp member 32 up and down. However, motor 40 may be electric or hydraulic as well.

When the clamp member 32 is moved into contact with the underside of the workpiece 12, thereby positioning the workpiece 12 between a face portion 31 of the clamp member 32 and mating surface or guide portion 24 of the nosepiece 23, pressure (preferably pneumatic pressure) is applied by the clamp member 32 against tne workpiece thereby squeezing the clamp member 32 and the mating surface 24 together against the workpiece 12. Rubber pads 35 are provided on the clamp member 32 which make contact with the underside of the workpiece 12 and prevent marring of the undersurface of the workpiece 12. The same power source is preferably used for both applying clamp pressure and for moving the clamp 32.

Common control 33 is utilized to control both the movement of the clamp member 32 relative to the workpiece 12 and the application and release of clamp pressure. A four way toggle switch 42 controls the flow of air to a pneumatic piston moving the clamp member 32 and also controls the air to the clamp member 32 which applies or releases pressure thereto. The operator of tne drill system can thus properly position the nosepiece 23 on the workpiece 12 with one hand and with the other hand operate the toggle switch 42 to both move the clamp member 32 into position against the workpiece 12 and apply clamping pressure thereto so as to precisely secure the drill system in the desired position on the workpiece 12. Since the feed unit 16 and the drill 18 are both preferably pneumatic, the control 33 (preferably a valve) for the clamp member may also control the drill 18 and feed unit 16. From the foregoing it is apparent that the operator of the system of the present invention may quickly and easily manually perform precision drilling therewith.

Accordingly, there has been provided, in accordance with the invention, a portable drilling system that fully satisfies the objectives set forth above. It is to be understood that all terms used herein are descriptive rather than limiting. Although the invention has been described in conjunction with the specific embodiments set forth above, many alternative embodiments, modifications and variations will be apparent to those skilled in the art in light of the disclosure set forth herein. Accordingly, it is intended to include all such alternatives, embodiments, modifications and variations that fall within the spirit and scope of the invention as set forth in the claims hereinbelow.

I claim:

1. A portable drill system for drilling a hole in a workpiece, comprising:
- a drill;
- a drill bit operably connected to the drill;
- a power source connected to the drill for driving said bit;
- feed means for feeding said bit into and out of the workpiece;
- a housing for said feed means;
- a guide plate detachably mounted to the workpiece, said guide plate engaging a head portion of said drill to guide said drill bit into a desired location on the workpiece; and
- a clamp means connected to said housing for clamping the workpiece against said housing.

2. The drill system of claim 1 wherein said clamp means includes a clamp member engaging the workpiece at a side thereof opposite the side which contacts said housing.

3. The system of claim 2 wherein said clamp means is connected to said housing so that said clamp member can move toward and away from said housing.

4. The system of claim 3 also including fluid power means for moving said clamp member toward said housing and causing said clamp member to clamp the workpiece against said housing.

5. The system of claim 4 wherein said clamp member applies clamping force to the workpiece, the direction of the clamping force being substantially in alignment with said drill bit.

6. The system of claim 1 wherein said feed means is a pneumatically powered feed unit.

7. The system of claim 6 further including a single control means for controlling said power source, said fluid power means and said feed means.

8. The system of claim 1 further including a guide means for guiding said drill bit onto a desired location on the workpiece.

9. The system of claim 1 wherein said clamp member has a clamp face portion mating with the workpiece, said clamp face opposed to a nosepiece on said head portion of the drill so that tne workpiece is clamped into position between said clamp face and said nosepiece.

10. The system of claim 1 further including a means for controlling clamping force exerted by said clamp against the workpiece.

11. A portable, positive feed drill system, comprising:
- a drill;
- a drill bit mounted in the drill and operably connected thereto, said drill bit movable relative to the drill in a direction approximately normal to the workpiece;
- a drill feed unit;
- a housing for the drill and said feed unit, said housing being hand held;
- a clamp member mounted on an underside portion of said housing, said clamp member being hingedly connected thereto in order to swing away from and toward said housing to allow the workpiece to be clamped into a desired position between said clamp and said drill;
- a first power source operatively connected to said clamp member;
- a second power source operatively connected to said feed unit;
- a third power source operatively connected to the drill;
- a first means for controlling the power supplied to said clamp in order to swing said clamp into and out of a desired position relative to the workpiece;
- a second means for controlling the power supplied to said clamp in order to control the force exerted against the workpiece by said clamp member;
- a third means for controlling the power supplied to said feed unit;
- a guide plate removably secured to the workpiece, said plate having a hole therein;
- a nosepiece mounted on said drill in order to guide said drill bit into a desired position on the workpiece to drill a hole at a desired location therein.

12. The system of claim 11 wherein said first, second, and third means for controlling are a single control valve.

13. The system of claim 11 wherein said first power source is pneumatic.

14. The system of claim 11 wherein said second power source is pneumatic.

15. The system of claim 11 wherein said third power source is pneumatic.

16. A portable drill system for drilling a hole in a workpiece, comprising:
- a drill;
- a nosepiece mounted on said drill;
- a drill bit operably connected to the drill;
- a power source connected to the drill for driving said bit;
- feed means for feeding said bit into and out of the workpiece;
- a housing for said feed means;

a clamp means connected to said housing for clamping the workpiece against said housing, said clamp means having a clamp face portion mating with the workpiece, said clamp face opposed to said nosepiece so that the workpiece is clamped into position between said clamp face and said nose piece, said nosepiece being detachable from said drill to allow said face to be changed to accomodate a variety of surfaces of the workpiece with which said nosepiece mates.

17. A portable drill system for drilling a hole in a workpiece, comprising:

a drill;

a drill bit operably connected to the drill;

a power source connected to the drill for driving said bit;

feed means for feeding said bit into and out of the workpiece;

a housing for said feed means;

a guide plate having a hole therein;

a guide portion on said nosepiece, said guide portion mating with the hole on said guide plate in order to precisely position said drill on the workpiece to drill a hole at a desired location thereon; and a clamp means connected to said housing for clamping the workpiece against said housing.

* * * * *